United States Patent [19]

Wood et al.

[11] Patent Number: 5,883,161

[45] Date of Patent: *Mar. 16, 1999

[54] MOISTURE BARRIER MATERIAL COMPRISING A THERMOPLASTIC AND A COMPATIBLE CYCLODEXTRIN DERIVATIVE

[75] Inventors: Willard E. Wood, Arden Hills; Neil J. Beaverson, Hugo, both of Minn.

[73] Assignee: Cellresin Technologies, LLC, Minneapolis, Minn.

[*] Notice: The term of this patent shall not extend beyond the expiration date of Pat. No. 5,492,947.

[21] Appl. No.: 931,551

[22] Filed: Sep. 16, 1997

Related U.S. Application Data

[63] Continuation of Ser. No. 603,487, Feb. 20, 1996, abandoned, which is a continuation-in-part of Ser. No. 264,771, Jun. 23, 1994, Pat. No. 5,492,947.

[51] Int. Cl.$^6$ .............................. C08L 5/16; B65D 85/72; B65B 55/00
[52] U.S. Cl. ........................... 524/48; 426/112; 426/392; 426/410; 426/415
[58] Field of Search .................................... 426/112, 392, 426/410, 415; 524/48

[56] References Cited

U.S. PATENT DOCUMENTS 5,492,947  2/1996  Wood et al. .............................. 524/48
5,603,974  2/1997  Wood et al. .

Primary Examiner—Peter A. Szekely
Attorney, Agent, or Firm—Merchant, Gould, Smith, Edell, Welter & Schmidt, P.A.

[57] ABSTRACT

A moisture vapor barrier film composition can comprise a thermoplastic web comprising a thermoplastic polymer and a dispersed cyclodextrin composition having substituents that compatibilize the cyclodextrin in the film. The thermoplastic/cyclodextrin film obtains substantial barrier properties from the interaction between the substituted cyclodextrin in the film material with a water permeant. The substituents on the cyclodextrin molecule causes the cyclodextrin to be dispersible and stable in the film material resulting in an extrudable thermoplastic. Such materials can be used as a single layer film material, a multilayer film material which can be coated or uncoated and can be used in structural materials wherein the thermoplastic is of substantial thickness resulting in structural stiffness. The cooperation between the cyclodextrin and the thermoplastic polymer provides barrier properties to a web wherein a permeant can be complexed or entrapped by the cyclodextrin compound and held within the film preventing the moisture vapor permeant from passing through the film into the interior of a film, an enclosure or container.

11 Claims, 1 Drawing Sheet

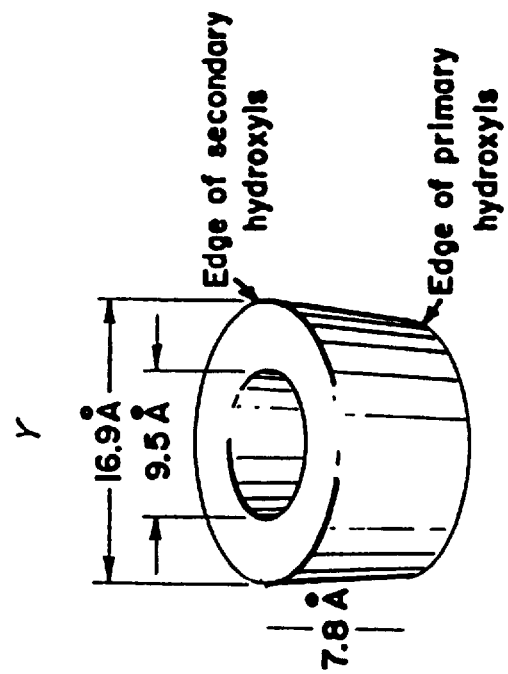
FIG.1A α
13.7 Å
5.7 Å
FIG.1B β
15.3 Å
7.8 Å
FIG.1C γ
16.9 Å
9.5 Å
7.8 Å
Edge of secondary hydroxyls
Edge of primary hydroxyls
Dimensions of cyclodextrins ns through the
film. Solubility is a measure of the concentration of the
permeant molecule that will be in position to migrate
through the film. Diffusion and solubility are important

MOISTURE BARRIER MATERIAL COMPRISING A THERMOPLASTIC AND A COMPATIBLE CYCLODEXTRIN DERIVATIVE

CROSS REFERENCE TO RELATED APPLICATIONS

This is a Continuation of application Ser. No. 08/603,487, filed Feb. 20, 1996 now abandoned, which application is a continuation-in-part application of Ser. No. 08/264,771, filed Jun. 23, 1994, now U.S. Pat. No. 5,492,947, which application(s) are incorporated herein by reference.

FIELD OF THE INVENTION

The invention relates to thermoplastic polymeric compositions used as packaging materials with moisture vapor barrier properties. The thermoplastic barrier material can take the form of a barrier coating, a flexible film, a semi-rigid or rigid sheet or a rigid structure. The thermoplastic barrier materials can also take the form of a coating manufactured from an aqueous or solvent based solution or suspension of thermoplastic film forming components containing as one component, the active moisture barrier forming materials. The thermoplastic barrier compositions of the invention can be extruded, laminated or molded into a variety of useful films, sheets, structures or shapes using conventional processing technology. Further, the monolayer, bilayer or multilayer films can be coated, printed or embossed.

BACKGROUND OF THE INVENTION

Much attention has been directed to the development of packaging materials in a film, a semi-rigid or rigid sheet and a rigid container made of a thermoplastic composition. In such applications, the polymeric composition preferably acts as a barrier to the passage of a variety of liquid water or moisture vapor permeant compositions to prevent contact between, e.g., the contents of a package and water. Improving barrier properties is an important goal for manufacturers of film and thermoplastic resins.

Barrier properties arise from both the structure and the composition of the material. The order of the structure (i.e.,), the crystallinity or the amorphous nature of the material, the presence of adsorbents or absorbents in the material, the existence of layers or coatings can affect barrier properties. The barrier property of many materials can be increased by using liquid crystal or self-ordering molecular technology, by axially orienting materials such as an ethylene vinyl alcohol film, or by biaxially orienting polypropylene films and by using other useful structures. Internal polymeric structure can be crystallized or ordered in a way to increase the resistance to permeation of a permeant. A material can be selected, for the thermoplastic or packaging coating, which prevents absorption of a permeant onto the barrier surface. The material can also be selected to prevent the transport of the permeant through the barrier.

The permeation process can be described as a multistep event. First, collision of the permeant molecule with the polymer is followed by sorption into the polymer. Next, migration through the polymer matrix by random hops occurs and finally the desorption of the permeant from the polymer completes the process. The process occurs to eliminate an existing chemical concentration difference between the outside of the film and the inside of the package. Permeability of an organic molecule through a packaging film consists of two component parts, the diffusion rate and solubility of the molecule in the film. The diffusion rate measures how fast molecule transport occurs through the film. Solubility is a measure of the concentration of the permeant molecule that will be in position to migrate through the film. Diffusion and solubility are important measurements of a barrier film's performance. There are two types of mechanisms of mass transfer for organic vapors permeating through packaging films: capillary flow and activated diffusion. Capillary flow involves small molecules permeating through pinholes or highly porous media. This is of course an undesirable feature in a high barrier film. The second, called activated diffusion, consists of solubilization of the penetrants into an effectively non-porous film at the inflow surface, diffusion through the film under a concentration gradient (high concentration to low concentration), and release from the outflow surface at a lower concentration. In non-porous polymeric films, therefore, the mass transport of a penetrant includes three steps—sorption, diffusion, and desorption. Sorption and desorption depend upon the solubility of the penetrant in the film. The process of sorption of a vapor by a polymer can be considered to involve two stages: condensation of the vapor onto the polymer followed by solution of the condensed vapor into the polymer. For a thin-film polymer, permeation is the flow of a substance through a film under a permeant concentration gradient. The driving force for permeation is given as the pressure difference of the permeant across the film. Several factors determine the ability of a permeant molecule to permeate through a membrane: size, shape, and chemical nature of the permeant, physical and chemical properties of the polymer, and interactions between the permeant and the polymer. A permeant for this application means moisture vapor or water vapor. A typical barrier material comprises a single layer of polymer, a two layer coextruded or laminated polymer film, a coated monolayer, bilayer or multilayer film having one, or more coatings on a surface or both surfaces of the film or sheet.

The two most widely used barrier polymers for food packaging are olefin polymers such as polyethylene, polypropylene, ethylene-vinyl alcohol copolymers (EVOH) ethylene vinyl acetate copolymers (EVA) and polyvinylidene chloride (PVDC). Other useful thermoplastics include ethylene acrylic materials including ethylene acrylic acid, ethylene methacrylic acid, etc. Such polymers are available commercially and offer some resistance to permeation of gases, flavors, aromas, solvents and most chemicals. PVDC is also an excellent barrier to moisture while EVOH offers very good processability and permits substantial use of regrind materials. EVOH copolymer resins are commonly used in a wide variety of grades having varying ethylene concentrations. As the ethylene content is reduced, the barrier properties to gases, flavors and solvents increase. EVOH resins are commonly used in coextrusions with polyolefins, nylon or polyethylene terephthalate (PET) as a structural layer. Commercially, amorphous nylon resins are being promoted for monolayer bottles and films. Moderate barrier polymer materials such as monolayer polyethylene terephthalate, polymethyl pentene or polyvinyl chloride films are available.

The following table lists a water vapor transition rate (WVTR) for each of a variety of packaging polymers. An inspection of this table and a comparison to similar permeation rates for other permeants such as oxygen, hydrocarbons, carbon dioxide, etc. shows that different permeants have differing permeation rates in various polymers. A polymer that is a good oxygen barrier is often a poor water vapor barrier. Such a relationship can be qualitatively established considering the mechanism of transport through a barrier. Barrier polymers often rely on dipole-dipole interactions to reduce chain mobility and, hence, diffusional movement of permeants. These dipoles can be good sites for hydrogen bonding. Water molecules are attracted to these sites leading to a high solubility characteristic. Excellent examples of dipole-dipole interaction as a function of WVTR @ 37.80° C. or 38° C. and 90% RH.

| POLYMER[1] | WVTR |
| --- | --- |
| Fluoropolymer | 0.0119–0.0236 |
| PVDC | 0.02 |
| HDPE | 0.17 |
| PP | 0.4 |
| EVOH (@ 40° C.) | 0.79–2.4 |
| PET | 0.39–1.7 |

[1]decreasing dipole to dipole.

Further, water molecules can enhance the diffusion by interrupting attractions and chain packing of the barrier material. Polymer molecules without substantial dipole-dipole interaction such as polyolefins, dissolve very little water and have low WVTR and other similar permeability values. The lower solubility more than compensate for the incrementally higher diffusion.

As expected, the solubility and diffusivity of liquids and gases in polymers are strongly dependent upon polymer molecular structure, chemical composition and polymer morphology. Properties related to solubility, such as permeability, also behave in a similar fashion. Accordingly, from solubility theory it is expected that the solubility of an organic penetrant in a polymer is related to the difference between the solubility parameter ($\delta$) of both the penetrant and polymer. Good solubility is expected when the difference between solubility parameter values is close to a mean zero. It should be pointed out, however, that the solubility-parameter approach is useful only in the absence of strong polymer-penetrant interactions, such as hydrogen bonding.

The relationship between penetrant transfer characteristics and the basic molecular structure and chemical composition of a polymer is rather complex, and a number of factors contribute to the sorption and diffusion processes, among the most important being:

(a) structure regularity or chain symmetry, which can readily lead to a three-dimensional order of crystallinity. This is determined by the type of monomer(s) and the conditions of the polymerization reaction;

(b) cohesive-energy density, which produces strong intermolecular bonds, Van der Waals or hydrogen bonds and regular, periodic arrangement of such groups;

(c) chain alignment or orientation which allows laterally bonding groups to approach each other to the distance of best interaction, enhancing the tendency to form crystalline materials; and (d) the glass transition temperature (Tg) of the polymer, above which free vibration and rotational motion of polymer chains occur so that different conformations can be assumed.

Polymer free volume is also a function of structural regularity, orientation and cohesive energy density. The aforementioned structure-property relationships all contribute to a decrease in solubility and diffusivity, and thus permeability.

Examples of the effect of polymer molecular structure and chemical composition on the sorption equilibrium and diffusion values for acetone vapor by a series of barrier polymer films of varying functionality are shown in Table 1.

TABLE 1

Water-vapor Transmission Rates of Selected Polymers[a]

| Polymer | WVTR, nmol/(m.s) |
| --- | --- |
| vinylidene chloride copolymers | 0.005–0.05 |
| high density polyethylene (HDPE) | 0.095 |
| polypropylene | 0.16 |
| low density polyethylene (LDPE) | 0.35 |
| ethylene-vinyl alcohol, 44 mol % ethylene[b] | 0.35 |
| poly(ethylene terephthalate) (PET) | 0.45 |
| poly(vinyl chloride) (PVC) | 0.55 |
| ethylene-vinyl alcohol, 32 mol % ethylene | 0.95 |
| nylon-6,6 nylon-11 | 0.95 |
| nitrile barrier resins | 1.5 |
| polystyrene | 1.8 |
| nylon-6 | 2.7 |
| polycarbonate | 2.8 |
| nylon-12 | 15.9 |

[a]At 38° C. and 90% RH unless otherwise noted (13).
[b]Measured at 40° C.
(Kirk-Othmer, Encyclopedia of Chemical Technology, p. 943, Volume 3 (4th Ed.), Wiley-Interscience)

An inspection of the table shows that a film made from these materials can have an appreciable moisture vapor transmission rate. However, in many applications improvement is needed. Contact between a packaged food, water sensitive material, or other item contained within the package with moisture vapor can result in a sensory change and/or spoilage. Control of moisture exchange with the environment, accomplished through barrier packaging, is crucial for moisture sensitive foods. Foods are complex biologically and chemically active systems that require strict control over their manufacturing, distribution and storage conditions in order to maintain a safety and sensory and nutritive values. Shelf life is the time period between processing and use during which a food stays within acceptable limits of quality. To ensure a high quality product for at least its targeted shelf life, environmental conditions such as temperature, moisture, gas composition and light must be controlled. Barrier packaging can be used to accomplish moisture control, gas composition and light effects. The primary function of the food package, besides serving as a containing unit, is to keep the food in a controlled microenvironment. The package itself becomes part of the food environment and the food package interactions have to be considered. The package can include an artificial atmosphere, can prevent light from penetrating and altering the food composition, and can maintain the water activity of the food constant or ensure that no additional moisture comes in contact with the food contents.

Water is of major importance in food preservation. Maintaining low water activity can act as an important preservation technique. Moisture content or activity ($A_w$) can improve the texture quality, the tendency to lipid oxidation, the tendency for non-enzymatic browning, the enzymatic activity and the mold and bacteria growth. Water activity describes the degree of boundness of the water contained in the food and its availability to act as a solvent and participate in chemical or biochemical reactions. Critical levels of water activity can cause undesirable deterioration. From a safety standpoint, increased water activity can promote microbial growth. Textural qualities are also very important for consumers. Texture is greatly affected by water activity. Dry, crisp foods like potato chips, popcorn, crackers, corn flakes, and other breakfast or snack foods can quickly lose crispness and can become texturally unacceptable as moisture activity increases from about 0.3 to greater than 0.5 or more. Foods with intermediate moisture activity such as dried fruits, pet foods, bakery goods, etc. can become hard if water activity drops below about 0.6. Unpopped popcorn requires a water activity greater than about 0.3–0.5 to increase popping volume. Further, a number of the chemical constituents of foods can change from amorphous to crystalline or from crystalline to amorphous stage during storage in inappropriate water activities. Further, the ability of water to act as a solvent or reaction medium can change the nature and quality of the food product. Many reactions that promote food deterioration can increase in reaction rate as water activity increases. Clearly, water activity in foods is a significant feature. The ability to maintain foods within a certain water activity can be critical. Packaging should be able to prevent drying and prevent introduction of increased water activity into a food. The packaging industry has worked for many years to improve the barrier properties of a variety of packaging materials such as those shown in Table 1.

Substantial attention is now directed to a variety of technologies for the improvement of moisture vapor barrier properties. The use of both physical barriers and active chemical barriers or traps in packaging materials are under active investigation. In particular, attention has focused on use of specific copolymer and terpolymer materials, the use of specific polymer alloys, the use of improved coatings for barrier material such as silica, metals, organometallics, and other strategies.

Packaging scientists are continuing to develop new polymeric films, coated films, polymeric alloys, etc. using blends of materials to attain higher barrier properties. Many of these systems have attained some degree of utility but have failed to achieve substantial commercial success due to a variety of factors including obtaining barrier performance at low cost.

Yeh et al., U.S. Pat. No. 5,106,677 teach a water vapor barrier material comprising a styrene-butadiene polymer containing about 0.5–10% of a polyethylene wax as a barrier additive. Thomas et al., U.S. Pat. No. 5,378,510 disclose a barrier film made by forming a coating on the film using an organosilicon reagent in an oxygen atmosphere. Kunz et al., U.S. Pat. No. 5,387,449 teach a polymer laminate containing layers of polyester-ceramic materials or polyolefin materials. Deak et al., U.S. Pat. No. 5,085,904 teach a multilayer structure containing film materials such as polyester and barrier layers of silica materials. Lohwasser, U.S. Pat. No. 5,436,035 teach barrier materials comprising coated plastic films. The coatings are generated in a plasma phase and comprise ceramics such as silicon dioxide, silicon monoxide, aluminum oxide and others. Percec et al., U.S. Pat. No. 5,114,795 teach a multilayered barrier laminate film. Kuechler et al., U.S. Pat. No. 5,324,572 teach a multilayer laminate film having improved barrier properties. Sibbach et al., U.S. Pat. No. 4,912,103 teach a heat sealable barrier laminate film. Jorge et al., U.S. Pat. No. 5,073,617 teach an improved barrier film made by extrusion and then post-treating the film after extrusion to optimize barrier properties.

One problem that arises when searching for polymer blends or compounded polymeric materials, relates to the physical properties of the film. Films must retain substantial clarity, tensile strength, resistance to penetration, tear resistance, etc. to remain useful in packaging materials. Blending unlike materials into a thermoplastic before film extrusion often results in a substantial reduction of film properties. Finding compatible polymer materials for polymer alloys, and compatible additives for polymeric materials typically require empirical demonstration of compatibility and does not follow a clearly developed theory. However compatibility can be demonstrated by showing that the compounded material obtains an improved barrier quality with little reduction in clarity, processability, or structural properties using conventional test methods. Accordingly, a substantial need exists for development of materials that can be incorporated into polymeric material to form a packaging thermoplastic having excellent barrier properties without any substantial reduction in structural properties.

BRIEF DISCUSSION OF THE INVENTION

I have found that the moisture vapor barrier properties of a thermoplastic polymer can be improved, without any important reduction in clarity, processability or structural properties, by forming a moisture or water vapor barrier layer with a dispersed compatible cyclodextrin derivative in the polymer. We have found that a substantial improvement in water vapor barrier properties can be achieved using this technology. The increased barrier properties appear to arise in both generally moisture permeable films and relatively high moisture barrier films. The permeability of a number of polymer materials to a variety of permeant gases or vapors including oxygen, carbon dioxide and water is shown in *Lang's Handbook of Chemistry*, Fourth Edition, McGraw Hill, Inc., 1992, pp. 10.66–10.68.

I have developed two embodiments. The first comprises a barrier made using the thermoplastic technology to form a film containing the cyclodextrin derivative. The second, a coating made from a solution or suspension of a film forming polymer or polymer forming material combined with the cyclodextrin derivative to form a barrier layer. The cyclodextrin molecule without a compatible substituent group is often not sufficiently compatible in the bulk material to result in a clear useful barrier layer or packaging material. The compatible cyclodextrin derivative is a compound substantially free of an inclusion complex. For this invention the term "substantially free of an inclusion complex" means that the quantity of the dispersed cyclodextrin derivative in the film contains a large fraction having cyclodextrin rings free of a permeant in the interior of the cyclodextrin molecule. The cyclodextrin compound will be added without complex, but some complexing can occur during manufacture from polymer degradation or from inks or coatings components. The internal cavity of the cyclodextrin remains unoccupied by any complexed molecule.

The cyclodextrin derivative has a substituent group bonded to the cyclodextrin molecule that is compatible with the polymeric material. Cyclodextrin is a cyclic dextran molecule having six or more glucose moieties in the molecule. The cyclodextrin derivative can contain at least one substituent on a cyclodextrin primary carbon atom. Preferably, the cyclodextrin is an α-cyclodextrin (αCD), a β-cyclodextrin (βCD), a γ-cyclodextrin (γCD) or mixtures thereof. We have found that the derivatization of the cyclodextrin molecule is essential for forming a cyclodextrin material that can be effectively blended into the thermoplastic bulk polymer material with no loss in clarity, processability or structural or packaging properties. The substituents on the cyclodextrin molecule are selected to possess a composition, structure and polarity to match that of the polymer to ensure that the cyclodextrin is sufficiently compatible in the polymer material. Further, a derivatized cyclodextrin is selected that can be blended into the thermoplastic polymer, formed into film, semirigid or rigid sheet or other rigid structural materials using conventional thermoplastic manufacturing techniques. Lastly, we have found that the cyclodextrin material can be used in forming such thermoplastic barrier structures without any substantial reduction in structural properties.

We have also found that inclusion of the cyclodextrin derivatives in the moisture vapor barrier thermoplastic materials of the invention can improve other properties of the film such as surface tension, static charge properties and other properties that improve the adaptability of this barrier material to coating and printing. The cyclodextrin derivative materials can be included in a variety of a film and sheet. Foods and moisture-sensitive objects such as electronics can be packaged in the films of the invention.

BRIEF DESCRIPTION OF THE DRAWINGS

FIG. 1 is a graphical representation of the dimensions of the cyclodextrin molecule without derivatization. The α, β and γ cyclodextrins are shown.

DETAILED DESCRIPTION OF THE INVENTION

Film

A film or a sheet is a flat unsupported section of a thermoplastic resin whose thickness is much smaller than its width or length. Films are generally regarded as being 0.25 millimeters (mm) or less, typically 0.01 to 20 mm thick. Sheet may range from about 0.25 mm to several millimeters (mm), typically 0.3 to 3 mm in thickness. Film or sheet can be used alone or in combination with other sheet, fabric or structural units through lamination, coextrusion or coating. For the invention the term "web" includes film, sheet, semi-rigid and rigid sheet and formed rigid units. Important properties include tensile strength, elongation, stiffness, tear strength and resistance; optical properties including haze, transparency; chemical resistance such as water absorption and transmission of moisture vapor and a variety of permeant materials including liquid and gaseous permeants; electrical properties such as dielectric constant; and permanence properties including shrinkage, cracking, weatherability, etc.

Thermoplastic materials can be formed into barrier film using a variety of processes including blown thermoplastic extrusion, linear biaxially oriented film extrusion and by casting from molten thermoplastic resin, monomer or polymer (aqueous or organic solvent) dispersion. These methods are well known manufacturing procedures. The characteristics in the polymer thermoplastics that lead to successful barrier film formation are as follows. Skilled artisans manufacturing thermoplastic polymers have learned to tailor the polymer material for thermoplastic processing and particular end use application by controlling molecular weight (the melt index has been selected by the thermoplastic industry as a measure of molecular weight—melt index is inversely proportional to molecular weight, density and crystallinity). For blown thermoplastic extrusion poly α-olefins (LDPE low density polyethylene, LLDPE linear low density polyethylene, HDPE high density polyethylene) are the most frequently used thermoplastic polymers, although polypropylene, nylon, nitriles, PETG poly(ethylene-co-terephthalate) and polycarbonate are sometimes used to make blown film. Polyolefins typically have a melt index from about 0.1 to 40 and preferably from 0.2 to 30 grams/10 mins., a density of about 0.910 to about 0.940 grams/cc, and a weight average molecular weight (Mw) that can range from about 200,000 to 500,000. Olefin polymers have a melt index range from 0.1 to 40, however, the range from 0.2 to 4 is typically used for producing flexible films due to polymer crystallinity and the equipment limitations. For biaxially oriented film extrusion the polymer most often used are olefin based—chiefly polyethylene and polypropylene (melt index from about 0.1 to 4, preferably 0.4 to 4, grams/10 mins. and a molecular weight (Mw) of about 200,000 to 600,000). Polyesters and nylons can also be used. For casting, molten thermoplastic resin or monomer dispersion are typically produced from polyethylene or polypropylene. Occasionally, nylon, polyester and polyvinyl chloride (PVC) are cast. For roll coating of aqueous based acrylic, urethane and polyvinylidene chloride (PVDC), etc. dispersions are polymerized to an optimum crystallinity and molecular weight before coating.

A variety of thermoplastic materials are used in making film and sheet products. Such materials include poly (acrylonitrile-co-butadiene-co-styrene) polymers, acrylic polymers such as the polymethylmethacrylate, poly-n-butyl acrylate, poly(ethylene-co-acrylic acid), poly(ethylene-co-methacrylate), etc.; cellophane, cellulosics including cellulose acetate, cellulose acetate propionate, cellulose acetate butyrate and cellulose triacetate, etc.; fluoropolymers including polytetrafluoroethylene (teflon), poly(ethylene-co-tetrafluoroethylene) copolymers, (tetrafluoroethylene-co-propylene) copolymers, polyvinyl fluoride polymers, etc., polyamides such as nylon 6, nylon 6,6, etc.; polycarbonates; polyesters such as poly(ethylene-co-terephthalate), poly(ethylene-co-1,4-naphthalene dicarboxylate), poly (butylene-co-terephthalate); polyimide materials; polyethylene materials including low density polyethylene; linear low density polyethylene, high density polyethylene, high molecular weight high density polyethylene, etc.; polypropylene, biaxially oriented polypropylene; polystyrene, biaxially oriented polystyrene; vinyl films including polyvinyl chloride, (vinyl chloride-co-vinyl acetate) copolymers, polyvinylidene chloride, polyvinyl alcohol, (vinyl chloride-co-vinylidene dichloride) copolymers, specialty films including polysulfone, polyphenylene sulfide, polyphenylene oxide, liquid crystal polyesters, polyether ketones, polyvinylbutyrl, etc.

Film and sheet materials are commonly manufactured using thermoplastic techniques including melt extrusion, calendaring, solution casting, and chemical regeneration processes. In many manufacturing steps an axial or a biaxial orientation step is used. The majority of film and sheet manufactured using melt extrusion techniques. In melt extrusion, the material is heated above its melting point in an extruder, as described in U.S. Pat. No. 5,603,974, issued Feb. 18, 1997 to Wood et al., which is expressly incorporated by reference herein.

We have found that in the preparation of biaxially oriented film and in the production of blown thermoplastic film that the melt temperature and the die temperature are important in obtaining the preferred MVTR for films of the invention, to reduce melt fracture and to improve film uniformity (reduce surface defects). In the previously referenced extruder, the temperature of the melt at the melt region should range from about 390°–420° F., preferably 395°–415° F. The temperature of the extrusion die should range from about 400°–435° F., preferably 410°–430° F. The extruded polymer can be cooled using ambient water baths or ambient air. The extruder can be operated at through put such that production rates can be maintained but the polymer can be sufficiently heated to achieve the melt and die temperatures required. Production of the films of the invention at these temperatures ensures that the cyclodextrin material is fully compatible in the thermoplastic melt, is not degraded by the high temperatures and a clear compatible useful barrier film is produced.

Often two thermoplastic materials are joined in a coextrusion process to produce tailored film or sheet products adapted to a particular end use. One or more polymer types in two or more layers of melt are coextruded in a coextrusion die to have a film with versatile properties dried from both layers. Layers of the different polymers or resins are combined by either blending the materials in melt before extrusion or by parallel extrusion of the different thermoplastics. The melt flows laminarly through the die and onto a quenched drum. The film is processed conventionally and may be oriented after cooling. Films can contain a variety of additives such as antioxidants, heat stabilizers, UV stabilizers, slip agents, fillers, and anti-block agents.

The moisture vapor barrier layer of the invention can also be made by casting an aqueous dispersion or solvent dispersion or solution of a film forming polymer and the cyclodextrin derivative. The aqueous or solvent based material can be formed by commonly available aqueous or solvent based processing of commercially available polymers, polymer dispersions, polymer solutions or both polymer and common aqueous or solvent processing technology. The cyclodextrin derivative material can be combined with such aqueous or solvent based dispersions or solutions to form a film forming or readily formed coating material. Such moisture vapor barrier layers or barrier coatings can be formed using commonly available coating technology including roller coating, doctor blade coating, spin coating, etc. While the coatings can be made and removed from a preparative surface, commonly coatings are formed on a thermoplastic or thermosetting polymer web, and remain in place to act as a barrier layer on a polymeric web used in a packaging. The typical coatings can be made from the same thermoplastic polymer materials used in film sheet or other structural layers using substantially similar loadings of the cyclodextrin derivative material. The barrier layer or barrier coatings formed using the film forming polymer and the cyclodextrin derivative can be used as a single coating layer or can be used in a multiple coating structure having a barrier layer or coating on one or both sides of a structural film or sheet which can be used with other coating layers including printing layers, clear coating layers and other layers conventional in packaging, food packaging, medical products and pharmaceutical packaging, consumer product packaging, etc.

Cyclodextrin

The moisture vapor thermoplastic barrier films of the invention contain a cyclodextrin having pendent moieties or substituents that render the cyclodextrin material compatible with the thermoplastic polymer. For this invention, compatible means that the cyclodextrin material can be uniformly dispersed into the melt polymer, can retain the ability to trap or complex water or moisture vapor and can reside in the polymer without substantial reductions in polymer film characteristics. Compatibility can be determined by measuring polymer characteristics such as tensile strength, tear resistance, etc., permeability or transmission rates for permeants, surface smoothness, clarity, etc. Non-compatible derivatives will result in substantial reduced polymer properties, very high permeability or transmission rates and rough dull film. Qualitative compatibility screening can be obtained by preparing small batches (100 grams-one kilogram of thermoplastic and substituted cyclodextrin). The blended material is extruded at production temperatures as a linear strand extrudate having a diameter of about one to five mm. Incompatible cyclodextrin materials will not disperse uniformly in the melt and can be seen in the transparent melt polymer immediately upon extrusion from the extrusion head. We have found the incompatible cyclodextrin can degrade at extrusion temperatures and produce a characteristic "burnt flour" odor in an extrusion. Further, we have found that incompatible cyclodextrin can cause substantial melt fracture in the extrudate which can be detected by visual inspection. Lastly, the extrudate can be cut into small pieces, cross-sectioned and examined using an optical microscope to find incompatible cyclodextrin clearly visible in the thermoplastic matrix.

Cyclodextrin is a cyclic oligosaccharide consisting of at least five, preferably six glucopyranose units or more joined by $\alpha(1\rightarrow 4)$ linkages. Although cyclodextrin with up to twelve glucose residues are known, the three most common homologs ($\alpha$ cyclodextrin, $\beta$ cyclodextrin and $\gamma$ cyclodextrin) having 6, 7 and 8 residues have been used (see Lichtenthaler et al., Tetrahedran Assymetry, Vol. 5, No. 11, pp 2045–2060.

Cyclodextrin is produced by a highly selective enzymatic synthesis. They consist of six, seven, or eight glucose monomers arranged in a donut shaped ring, which are denoted $\alpha$, $\beta$, or $\gamma$ cyclodextrin respectively (See FIG. 1). The specific coupling of the glucose monomers gives the cyclodextrin a rigid, truncated conical molecular structure with a hollow interior of a specific volume. This internal cavity, which is lipophilic (i.e.,) is attractive to hydrocarbon materials (in aqueous systems is hydrophobic) when compared to the exterior, is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

| CYCLODEXTRIN TYPICAL PROPERTIES | | | | |
|---|---|---|---|---|
| PROPERTIES | CD | $\alpha$-CD | $\beta$-CD | $\gamma$-CD |
| Degree of Polymerization (n = Molecular Size (A°) | | 6 | 7 | 8 |
| inside diameter | | 5.7 | 7.8 | 9.5 |
| outside diameter | | 13.7 | 15.3 | 16.9 |
| height | | 7.0 | 7.0 | 7.0 |
| Specific Rotation $[\alpha]_D^{25}$ | | +150.5 | +162.5 | +177.4 |
| Color of iodine complex | | Blue | Yellow | Yellowish Brown |
| Solubility in water (g/100 ml) 25° C. | | | | |
| Distilled Water | | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The parent cyclodextrin molecule, and useful derivatives, can be represented by the following formula (the ring carbons show conventional numbering) in which the vacant bonds represent the balance of the cyclic molecule:

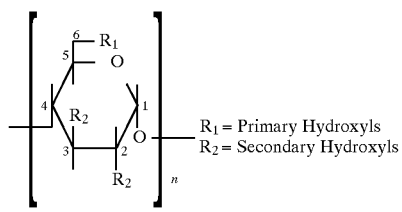

R₁ = Primary Hydroxyls
R₂ = Secondary Hydroxyls wherein $R_1$ and $R_2$ are primary or secondary hydroxyl as shown.

Cyclodextrin molecules have available for reaction with a chemical reagent the primary hydroxyl at the six position, of the glucose moiety, and at the secondary hydroxyl in the two and three position. Because of the geometry of the cyclodextrin molecule, and the chemistry of the ring substituents, all hydroxyl groups are not equal in reactivity. However, with care and effective reaction conditions, the cyclodextrin molecule can be reacted to obtain a derivatized molecule having all hydroxyl groups derivatized with a single substituent type. Such a derivative is a persubstituted cyclodextrin. Cyclodextrin with selected substituents (i.e.) substituted only on the primary hydroxyl or selectively substituted only at one or both the secondary hydroxyl groups can also be synthesized if desired. Further directed synthesis of a derivatized molecule with two different substituents or three different substituents is also possible. These substituents can be placed at random or directed to a specific hydroxyl. For the purposes of this invention, the cyclodextrin molecule needs to contain sufficient thermoplastic compatible substituent groups on the molecule to insure that the cyclodextrin material can be uniformly dispersed into the thermoplastic and when formed into a clear film, sheet or rigid structure, does not detract from the polymer physical properties.

Apart from the introduction of substituent groups on the CD hydroxyl other molecule modifications can be used. Other carbohydrate molecules can be incorporated into the cyclic backbone of the cyclodextrin molecule. The primary hydroxyl can be replaced using $SN_2$ displacement, oxidized dialdehyde or acid groups can be formed for further reaction with derivatizing groups, etc. The secondary hydroxyls can be reacted and removed leaving an unsaturated group to which can be added a variety of known reagents that can add or cross a double bond to form a derivatized molecule.

Further, one or more ring oxygen of the glycan moiety can be opened to produce a reactive site. These techniques and others can be used to introduce compatibilizing substituent groups on the cyclodextrin molecule.

The preferred preparatory scheme for producing a derivatized cyclodextrin material having a functional group compatible with the thermoplastic polymer involves reactions at the primary or secondary hydroxyls of the cyclodextrin molecule. Broadly we have found that a broad range of pendant substituent moieties can be used on the molecule. These derivatized cyclodextrin molecules can include acylated cyclodextrin, alkylated cyclodextrin, cyclodextrin esters such as tosylates, mesylate and other related sulfo derivatives, hydrocarbyl-amino cyclodextrin, alkyl phosphono and alkyl phosphate cyclodextrin, imidazoyl substituted cyclodextrin, pyridine substituted cyclodextrin, hydrocarbyl sulphur containing functional group cyclodextrin, silicon-containing functional group substituted cyclodextrin, carbonate and carbonate substituted cyclodextrin, carboxylic acid and related substituted cyclodextrin and others. The substituent moiety must include a region that provides compatibility to the derivatized material.

Acyl groups that can be used as compatibilizing functional groups include acetyl, propionyl, butyryl, trifluoroacetyl, benzoyl, acryloyl and other well known groups. Natural cyclodextrin derivatives include derivatives thereof such as glucosyl-α-cyclodextrin, glucosyl-β-cyclodextrin, glucosyl-γ-cyclodextrin, glucosyl-δ-cyclodextrin, glucosyl-ε-cyclodextrin, maltosyl-α-cyclodextrin, maltosyl-β-cyclodextrin, maltosyl-γ-cyclodextrin, maltosyl-γ-cyclodextrin, and maltosyl-ε-cyclodextrin. The formation of such groups on either the primary or secondary ring hydroxyls of the cyclodextrin molecule involve well known reactions. The acylation reaction can be conducted using the appropriate acid anhydride, acid chloride, and well known synthetic protocols. Peracylated cyclodextrin can be made. Further, cyclodextrin having less than all of available hydroxyls substituted with such groups can be made with one or more of the balance of the available hydroxyls substituted with other functional groups.

Cyclodextrin materials can also be reacted with alkylating agents to produced an alkylated cyclodextrin. Alkylating groups can be used to produce peralkylated cyclodextrin using sufficient reaction conditions exhaustively react available hydroxyl groups with the alkylating agent. Further, depending on the alkylating agent, the cyclodextrin molecule used in the reaction conditions, cyclodextrin substituted at less than all of the available hydroxyls can be produced. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl (4-methylbenzene sulfonyl) mesyl (methane sulfonyl) or other related alkyl or aryl sulfonyl forming reagents can be used in manufacturing compatibilized cyclodextrin molecules for use in thermoplastic resins. The primary —OH groups of the cyclodextrin molecules are more readily reacted than the secondary groups. However, the molecule can be substituted on virtually any position to form useful compositions.

Such sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyl. The sulfonyl chloride is used at appropriate mole ratios depending on the number of target hydroxyl groups in the molecule requiring substitution. Both symmetrical (per substituted compounds with a single sulfonyl moiety) or unsymmetrical (the primary and secondary hydroxyls substituted with a mixture of groups including sulfonyl derivatives) can be prepared using known reaction conditions. Sulfonyl groups can be combined with acyl or alkyl groups generically as selected by the experimenter. Lastly, monosubstituted cyclodextrin can be made wherein a single glucose moiety in the ring contains between one and three sulfonyl substituents. The balance of the cyclodextrin molecule remaining unreacted.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Large numbers of these azido or amino cyclodextrin derivatives have been manufactured. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino, piperizino, quaternary substituted alkyl or aryl ammonium chloride substituents, halogen derivatives of cyclodextrins can be manufactured as a feed stock for the manufacture of a cyclodextrin molecule substituted with a compatibilizing derivative. In such compounds the primary or secondary hydroxyl groups are substituted with a halogen group such as fluoro, chloro, bromo, iodo or other substituents. The most likely position for halogen substitution is the primary hydroxyl at the 6-position.

Hydrocarbyl substituted phosphono or hydrocarbyl substituted phosphato groups can be used to introduce compatible derivatives onto the cyclodextrin. At the primary hydroxyl, the cyclodextrin molecule can be substituted with alkyl phosphato, aryl phosphato groups.

The 2, and 3, secondary hydroxyls can be branched using an alkyl phosphato group.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups found above, sulfur containing groups manufactured based on sulfhydryl chemistry can be used to derivatize cyclodextrin. Such sulfur containing groups include methylthio (—SMe), propylthio (—SPr), t-butylthio (—S—C (CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Such groups include hydroxyethyl, 3-hydroxypropyl, methyloxyethyl and corresponding oxeme isomers, formyl methyl and its oxeme isomers, carbylmethoxy (—O—CH$_2$—CO$_2$H), carbylmethoxymethyl ester (—O—CH$_2$CO$_2$—CH$_3$). Cyclodextrin with derivatives formed using silicone chemistry can contain compatibilizing functional groups.

Cyclodextrin derivatives with functional groups containing silicone can be prepared. Silicone groups generally refer to groups with a single substituted silicon atom or a repeating silicone-oxygen backbone with substituent groups. Typically, a significantly proportion of silicon atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this invention the simple silicone containing substituent moieties are-preferred including trimethylsilyl, mixed methyl-phenyl silyl groups, etc. We are aware that certain βCD and acylated and hydroxy alkyl derivatives are available from American Maize-Products Co., Corn Processing Division, Hammond, Ind.

Packages and Packed Items

The thermoplastic containing the compatible derivatized cyclodextrin can be used in a variety of packaging formats to package a variety of items. General packaging ideas can be used. For example, the items can be packaged entirely in a film pouch, bag, etc. Further, the film can be used as a film closure on a rigid plastic container. Such containers can have a rectangular, circular, square or other shaped cross-section, a flat bottom and an open top. The container and a thermoplastic film closure can be made of the thermoplastic materials of the invention. Further, the thermoplastics of the invention can be used in the formation of blister pack packaging, clam shell type enclosures, tub, tray, etc. Generally, two product types require packaging in thermoplastic film of the invention having substantial water or moisture barrier properties. In one product type, protecting the product from contamination from moisture sources outside the packaging material is important. A second material must be packaged in moisture barrier materials preventing the odor of the material from exiting the package. A large variety of food odors are readily transmitted by a variety of packaging materials. Such food odors can attract insect and rodent pests, can be objectionable to customers or employees or can result in the substantial loss of important fragrance notes from packaged materials reducing product value. Important odors requiring substantial barriers include odors derived from coffee, ready to eat cereal, frozen pizza, cocoa or other chocolate products, dry mix gravies and soups, snack foods (chips, crackers, popcorn, etc.), baked foods, dry pet food (cat food, etc.), butter or butter-flavor notes, meat products, in particular butter or butter-flavor notes used in the manufacture of microwave popcorn in microwaveable paper containers, fruits and nuts, etc.

The moisture vapor barrier can comprise an extruded thermoplastic film or a thermoplastic layer, or a web, prepared from an aqueous or solvent based coating material. In either case, the barrier layer can comprise a major proportion of a thermoplastic polymer or polymer blend or alloy and an effective moisture vapor barrier amount of the substituted or modified cyclodextrin material. The modified cyclodextrin material can comprise about 0.01 to about 10 wt-% of the thermoplastic polymer, preferably about 0.1 to 5 wt-% of the thermoplastic polymer and most preferably for reasons of economy, high activity and ease of manufacture, about 0.1 to 2 wt-% of the thermoplastic material.

The above explanation of the nature of the cyclodextrin derivatives, thermoplastic films, manufacturing detail regarding the production of film, and the processes of cyclodextrin to make compatible derivatives provides a basis for understanding technology involving incorporating compatible cyclodextrin in thermoplastic film for barrier purposes. The following examples, film preparation and permeation data provide a further basis for understanding the invention and includes the best mode.

After our work in producing derivatives of cyclodextrins and compounding the cyclodextrins in thermoplastic films, we have found that the cyclodextrins can be readily derivatized using a variety of known synthetic chemical protocols. The cyclodextrin material can be melt blended into thermoplastic materials smoothly resulting in clear extrudable thermoplastic materials with the cyclodextrin materials uniformly distributed throughout the thermoplastic. Further, we have found that the cyclodextrin derivatives can be combined with a broad variety of thermoplastic films. The cyclodextrin materials can be incorporated into the films in a broad range of cyclodextrin concentrations. The cyclodextrin containing thermoplastic materials can be blown into films of varying thickness and can be blown free of melt fracture or other film or sheet variation. We have found in our experimentation that the barrier properties, i.e. reduction in transmission rate of water vapor can be achieved using the cyclodextrin derivative technology. We have also found that the use of cyclodextrin materials improve the surface properties of the film. The surface tension of the film surface and surface electrical properties were also improved. Such a result increases the utility of the films of the invention in coating, printing, laminating, handling, etc. In initial work we have found several modified cyclodextrin candidates were compatible with the LLDPE resin and provide good complexation of residual LLDPE volatile contaminants as well as reduce organic permeants diffusing through the film. Unmodified βCD adversely affects transparency, thermal stability, machinability, and barrier properties of the film. Conversely, selected modified βCD (acetylated and trimethylsilyl ether derivatives) have no affect on transparency and thermal stability. The machinability of the extruded plastic material is effected somewhat causing some surface defects, thereby reducing the barrier properties of the film.

The barrier film containing the substituted cyclodextrin can contain a variety of foods having a moisture activity ($A_w$) in the range of about 0.1 to about 0.8. Preferably, the moisture activity ranges between 0.1 and 0.6. Moisture activity is an important physio-chemical property of food. The water activity ($A_w$) of food is defined from the thermodynamic equilibrium state. Under normal conditions of atmospheric pressure, water activity is practically equal to the ratio of the water vapor pressure of the food, p, at equilibrium divided by the vapor pressure of pure water, $p_0$, at the same temperature and is related to the equilibrium relative humidity (%ERH):

$A_w = p/p_0 = $ %ERH divided by 100%.

As such, water activity is a unitless value. A large variety of foods fall within this moisture activity. The term control of moisture activity includes both ensuring that the moisture activity of the food does not increase and ensuring that the moisture activity of the food does not decrease undesirably. Included within this application are the following non-limiting foods, dry, crisp foods like potato chips, popcorns, crackers and corn flakes. Intermediate moisture food includes dried fruits, pet foods, bakery goods and confectionery items. Other foods include unpopped popcorn, pasta, lasagna noodles, amorphous sugars, candies, etc. Virtually any food that has a moisture activity that ranges from about 0.1 to about 0.6 can be included in the moisture barrier films of the invention. For the purpose of this application, we believe that a moisture vapor barrier film has a moisture vapor transmission rate of greater than about 0.8 gram-mil/100 inches$^2$-day, preferably greater than 0.5 gram-mil/100 inches$^2$-day.

QUALITATIVE PREPARATION

Initially, we produced four experimental test films. Three of the films contained β-cyclodextrin βCD at loading of 1%, 3% and 5% (wt./wt.) while the fourth was a control film made from the same batch of resin and additives but without βCD. The 5% loaded βCD film was tested for complexation of residual organic in the test film. Even though βCD was found to effectively complex residual organics in the linear low density polyethylene (LLDPE) resin, it was incompatible with the resin and formed βCD particle agglomerations.

We have evaluated nine modified βcyclodextrins and a milled β-cyclodextrin (particle size 5 to 20 microns). The different cyclodextrin modifications were acetylated, octanyl succinate, ethoxyhexyl glycidyl ether, quaternary amine, tertiary amine, carboxymethyl, succinylated, amphoteric and trimethylsilyl ether. Each experimental cyclodextrin (1% loading wt/wt) was mixed with low density polyethylene (LLDPE) using a Littleford mixer and then extruded using a twin screw Brabender extruder.

The nine modified cyclodextrin and milled cyclodextrin LLDPE profiles were examined under an optical microscope at 50× and 200×magnification. The microscopic examination was used to visually check for compatibility between LLDPE resin and cyclodextrin. Of the ten cyclodextrin candidates tested, three (acetylated, octanyl succinate and trimethylsilyl ether) were found visually to be compatible with the LLDPE resin.

Preparation of Cyclodextrin Derivatives

EXAMPLE I

An acetylated β-cyclodextrin was obtained that contained an average of 3.4 acetyl groups per cyclodextrin on the primary —OH group.

EXAMPLE II

Trimethyl Silyl Ether of β-cyclodextrin

Into a rotary evaporator equipped with a 4000 milliliter round bottom flask and a nitrogen atmosphere, introduced at a rate of 100 milliliters $N_2$ per minute, was placed three liters of dimethylformamide. Into the dimethylformamide was placed 750 grams of β-cyclodextrin. The β-cyclodextrin was rotated and dissolved in dimethylformamide at 60° C. After dissolution, the flask was removed from the rotary evaporator and the contents were cooled to approximately 18° C. Into the flask, placed on a magnetic stirrer and equipped with a stir bar, was added 295 milliliters of hexamethyldisilylazine (HMDS-Pierce Chemical No. 84769), followed by the careful addition of 97 milliliters of trimethylchlorosilane (TMCS-Pierce Chemical No. 88531). The careful addition was achieved by a careful dropwise addition of an initial charge of 20 milliliters and after reaction subsides the careful dropwise addition of a subsequent 20 milliliter portions, etc. until addition is complete. After the addition of the TMCS was complete, and after reaction subsides, the flask and its contents were placed on the rotary evaporator, heated to 60° C. while maintaining an inert nitrogen atmosphere flow of 100 milliliters of $N_2$ per minute through the rotary evaporator. The reaction was continued for four hours followed by removal of solvent, leaving 308 grams of dry material. The material was removed from the flask by filtering, washing the filtrate with deionized water to remove the silylation products, vacuum oven drying (75° C. at 0.3 inches of Hg) and stored as a powdered material and maintained for subsequent compounding with a thermoplastic material. Subsequent spectrographic inspection of the material showed the β-cyclodextrin to contain an average of approximately 1.7 trimethylsilylether substituent per β-cyclodextrin molecule. The substitution appeared to be commonly on a primary 6-carbon atom.

EXAMPLE III

An hydroxypropyl β-cyclodextrin was obtained with an average of 1.5 hydroxypropyl groups per molecule on the primary 6 carbon —OH group of the βCD.

EXAMPLE IV

An hydroxyethyl β-cyclodextrin was obtained with an average of 1.5 hydroxyethyl groups per molecule on the primary 6 carbon —OH group of the βCD.

Preparation of Films

We prepared a series of films using a linear low density polyethylene resin, βCD and derivatized βCD such as the acetylated or the trimethylsilyl derivative of a β-cyclodextrin. The polymer particles were dry blended with the powdered β-cyclodextrin and β-cyclodextrin derivative material, a fluoropolymer lubricant (Dynamar from 3M Co.) and primary and secondary antioxidants until uniform in the dry blend. The dry blend material was mixed and extruded in a pellet form in a Haake System 90, ¾" conical extruder. The resulting pellets were collected for film preparation.

Table 2 displays typical pelletizing extruder conditions. The films were blown in an extruder as described in U.S. Pat. No. 5,603,974, as previously referenced according to the above protocol and reported in Table 3. The film was tested for transmission rates at a variety of environmental conditions. Environmental test conditions are shown below in Table II.

TABLE 2

| 0.5% TMSE Pelletizing 1-19-94 | | | | | | | |
|---|---|---|---|---|---|---|---|
| Run Time | 0 min 13 sec | Torque Tot. Torque | | 4866 meter-gram 0.0 mkg-min | Rotor Aux. | 198 rpm 0% | |
| Channels | -1- | -2- | -3- | -4- | -5- | -6- | |
| Melt Temp | 37 | 41 | 41 | 41 | 41 | | °C. |
| Set Temp | 150 | 160 | 160 | 170 | 0 | 0 | °C. |
| Deviation | 0 | 0 | 0 | 0 | 0 | 0 | °C. |
| Cooling | Yes | Yes | Yes | Yes | | | |
| Pressure | 0 | 0 | 2739 | 0 | 0 | | psi |

TABLE 3

Extruded Films (Exxon LL3201)
Made With Low Density Polyethylene

| Roll No. | Sample ID | Fluoropolymer Additive[1] | Extruder Temp. Zone 3 (F.) | Melt Temp (F.) | Die Temp. Zone 3 (F.) | Lbs./Hr | RPM | Die Gap | Comments |
|---|---|---|---|---|---|---|---|---|---|
| 1 | Control | 500 ppm | 428 | 406 | 406 | 30.1 | 50 | 25 | |
| 2 | 1% Ex. I | 1000 ppm | 441 | 415 | 420 | 29.7 | 50 | 35 | |
| 3 | 1% Ex. I | 1000 ppm | 441 | 416 | 420 | 28.5 | 50 | 35 | |
| 4 | 1% Ex. I | 500 ppm | 441 | 415 | 420 | 29.9 | 50 | 35 | |
| 5 | 1% Ex. I | 500 ppm | 418 | 405 | 414 | 29.9 | 50 | 35 | |
| 6 | 1% Ex. I | 500 ppm | 421 | 397 | 414 | 29.0 | 50 | 35 | |
| 7 | 0.5% Ex. I | 500 ppm | 421 | 403 | 415 | 29.0 | 50 | 35 | |
| 8 | 2% Ex. I | 500 ppm | 421 | 404 | 415 | 27.7 | 50 | 35 | Very slight melt fracture. |
| 9 | 1% Ex. II | 500 ppm | 421 | 406 | 415 | 28.3 | 50 | 35 | Particles in film. |
| 10 | 1% Ex. II | 500 ppm | 426 | 410 | 415 | 26.7 | 50 | 35 | Particles in film. |
| 11 | 1% Ex. II | 500 ppm | 432 | 415 | 414 | 29.0 | 50 | 35 | Particles in film. Very slight yellowing to film. |
| 12 | 1% Ex. II | 500 ppm | 431 | 414 | 415 | 21.5 | 39 | 35 | Particles in film. |
| 13 | 0.5% Ex. II | 500 ppm | 431 | 415 | 415 | 27.7 | 50 | 35 | Particles in film. |
| 14 | 0.5% Ex. II | 500 ppm | 425 | 410 | 415 | 28.9 | 50 | 35 | Particles in film. |
| 15 | 2% Ex. II | 500 ppm | 410 | 414 | 415 | 20.2 | 38 | 35 | Particles in film. Very slight yellowing to film. |
| 16 | 2% Ex. II | 500 ppm | 422 | 415 | 415 | 20.5 | 38 | 35 | Particles in film. Very slight yellowing to film. |
| 17 | 2% Ex. II | 500 ppm | 422 | 416 | 415 | 20.5 | 38 | 35 | Particles in film. Very slight yellowing of film. |

[1]Also contains 500 ppm Irganox 1010 antioxidant and 1000 ppm IrgaFos 168.

The results of the testing (see Tables 4, 5A–5C and 6A–6C) show that the inclusion of a compatible cyclodextrin material in the thermoplastic films of the invention substantially improves the moisture vapor barrier properties by reducing its transmission rate. The data showing the improvement in transmission rate is shown below in the following data tables.

We also prepared a series of aqueous coatings containing hydroxypropyl βCD that we believe can act as moisture barriers. One of the coatings was prepared from a 10% acrylic emulsion (a polyacrylic acid polymer having a molecular weight of about 150,000 purchased from Polysciences, Inc.). The 10% acrylic emulsion contained hydroxypropyl βCD at a 5% and 10% by weight loading based on the polymer. These solutions were used to hand-coat test film samples by laminating two films. The coatings were applied to linear low density polyethylene film sheet containing 0.5% acetylated βCD (Roll No. 7) and to a second film sheet containing 2% acetylated βCD (Roll No. 8) using a hand roller and then laminating the films. The films were not stretched during lamination. All coated samples were placed in a vacuum laminating press to remove air bubbles between the film sheets. The acrylic coating thickness was about 0.0002 inch. An acrylic coated control was prepared in an identical manner containing no hydroxypropyl βCD.

A second coating was prepared from a vinylidene chloride latex (PVDC, 60 wt-% solids) purchased from Dagax Laboratories, Inc. The PVDC latex coating was prepared with two levels of hydroxypropyl βCD-10% and 20% by weight of the derivatized cyclodextrin. These solutions were used to hand-coat linear low density polyethylene test film samples by laminating the two films together. The coatings were applied to two control film sheets (rolled into one) using a hand roller and laminated together. The films were not stretched during lamination process. All coated samples were placed in a vacuum laminating press to remove air bubbles between the film sheets. The PVDC coating thickness was approximately 0.0004 inch. A PVDC coated control was prepared in an identical manner but without hydroxypropyl βCD. We believe these coatings can act as successful moisture barriers.

The data following the preparatory examples showing improvement in transmission rate was obtained using the following general test method.

Method Summary

This method involves experimental techniques designed to measure the permeability of selected organic molecules through food packaging films, using a static concentration gradient. The test methodology simulates accelerated shelf-life testing conditions by implementing various storage humidities, product water activities and temperature conditions and using organic molecule concentrations found in previously tested food products to simulate outside-the-package organic vapors in the permeation test cell. This procedure allows for the determination of the following compounds: ethanol, toluene, p-xylene, o-xylene, 1,2,4-trimethyl benzene, naphthalene, naphtha solvent blend, etc.

| Test Compounds | Threshold Odor Conc. ul/L ppm | Environmental Cell Conc. ul/L ppm |
|---|---|---|
| Ethanol | 5–5000 | 20 |
| Toluene | 0.10–20 | 3 |
| p-Xylene | 0.5 | 2 |
| o-Xylene | 0.03–12 | 1 |
| 1,2,3-Trimethyl Benzene | NA | 0.5 |
| Naphthalene | 0.001–0.03 | 0.5 |
| Naphtha Solvent Blend | NA | 40 |

Table 1. Permeant Test Compounds

In a typical permeation experiment, three steps are involved. They are (a) the instrument sensitivity calibration, (b) film testing to measure transmission and diffusion rates, and (c) the quality control of the permeation experiment.

Film samples are tested in a closed-volume permeation device. High-resolution gas chromatograph (HRGC) operated with a flame ionization detector (FID) is used to measure the change in the cumulative penetrant concentration as a function of time.

Sample-side and environment-side test compound concentrations are calculated from each compound's response factor or calibration curve. Concentrations are then volume-corrected for each specific set of permeation cells if permeant mass is desired.

The cumulative penetrant concentration is plotted as a function of time on both the upstream (environment) and downstream (sample) side of the film. The diffusion rate and transmission rate of the permeant are calculated from the permeation curve data.

1.0 Equipment and Reagents 2.1 Equipment

Gas chromatograph (HP 5880) equipped with flame ionization detector, a six-port heated sampling valve with 1 ml sampling loop and data integrator J&W capillary column. DB-5, 30M×0.250 mm ID, 1.0 umdf.

Glass permeation test cell as described in U.S. Pat. No. 5,603,974, as previously referenced.

Permeation cell clamping rings (2).

Permeation cell aluminum seal rings (2).

Natural Rubber Septa. 8 mm OD standard-wall or 9 mm OD (Aldrich Chemical Company, Milwaukee, Wis.).

Assorted laboratory glass ware and syringes.

Assorted laboratory supplies.

2.2 Reagents

Reagent water. Water in which interferences are not observed at the MDL of the chemical analytes of interest. A water purification system is used to generate reagent water which has been boiled to 80% volume, capped, and allowed to cool to room temperature before use.

Stock Ethanol/Aromatic Standard solution. Ethanol (0.6030 gram), toluene (0.1722 gram), p-xylene (0.1327 gram), o-xylene (0.0666 gram), trimethylbenzene (0.0375 gram) and naphthalene (0.0400 gram) package in 1 ml sealed glass ampules. Naphtha blends standard is a commercial paint solvent blend containing approximately twenty (20) individual aliphatic hydrocarbon compounds obtained from Sunnyside Corporation, Consumer Products Division, Wheeling, Ill.

Triton X-100. Nonylphenol nonionic surface active agent (Rohm and Hass).

2.0 Standards Preparation 2.2 Permeation Working Standard

A stock permeant test standard solution is used. These standards are prepared by weight from neat certified reference compounds, actual weight and weight percent are shown.

The working ethanol/aromatic standard is prepared by injecting 250 ul of the stock standard solution into 100 ml of reagent water containing 0.1 gram of surfactant (Triton X-100). It is important that the Triton X-100 is completely dissolved in the reagent water prior to adding the permeant stock standard. This will insure dispersing the test compounds in the water. In addition, the working standard should be mixed thoroughly each time an aliquot is dispensed. It is advisable to transfer the working standard to crimp-top vials with no headspace to minimize losses due to the large headspace in the volumetric flask used to prepare the standard.

A working naphtha blend standard is prepared by injecting 800 μL of the "neat" naphtha solvent blend into 100 milliliters of reagent water containing 0.2 gram of surfactant (Triton X-100).

An opened stock standard solution should be transferred from the glass snap-cap vial to a crimp-top vial for short-term storage. The vials may be stored in an explosion-proof refrigerator or freezer.

2.1 Calibration Standards

Calibration standards are prepared at a minimum of three concentration levels by adding volumes of the working standard to a volumetric flask and diluting to volume with reagent water. One of the standards is prepared at a concentration near, but above, the method detection limit. The other concentrations correspond to the expected range of concentrations found in the environment and sample side cells.

3.0 Sample Preparation

3.1 Film Sample Preparation

The permeation test cell, also known as an environment flask, is described in U.S. Pat. No. 5,603,974, as previously referenced. Sample flask are washed before use in soapy water, thoroughly rinsed with deionized water, and oven-dried. Following cleaning, each flask is fitted with a rubber septum.

The film test specimen is cut to the inside diameter of the aluminum seal ring using a template. The film test specimen diameter is important to prevent diffusion losses along the cut edge circumference. The film sample, aluminum seals, and flasks are assembled as shown in FIG. 3, but the clamping ring nuts are not tightened.

The test cell is prepared as described in U.S. Pat. No. 5.603,974, as previously referenced.

The sample side is injected with 2 $\mu$L of water per 300 ml flask volume. Since the sample flasks vary in volume, the water is varied to correspond to the volume variations. The 2 $\mu$L of water in the 300 ml flask volume is comparable to a 0.25 water activity product at 72° F. Next, 40 $\mu$L, the permeation ethanol/aromatic working standard or 40 $\mu$L of the naphtha blend working standard prepared according to section 2.2, is injected into the environmental flask. Either of these working standards will produce a 60% relative humidity at 72° F. with a permeant concentration (parts per million-volume/volume) in the 1200 ml volume flask indicated in Table I. Other humidities or permeant concentrations may be employed in the test method by using psychrometric chart to determine humidity and using the gas loss to calculate permeant concentration. The time is recorded and the permeation cell placed into a thermostatically controlled oven. Samples may be staggered to accommodate GC run time. Three identical permeation devices are prepared. Triplicate analyses are used for QC purposes.

At the end of each time interval, a sample from the group is removed from the oven. The environmental flask is analyzed first, using a heated six-port sampling valve fitted with a 1 ml loop. The loop is flushed with a 1 ml volume of the environment-side or sample-side air. The loop is injected onto the capillary column. The GC/FID system is started manually following the injection. Up to eight 1 ml sample injections may be taken from the sample and environment side of a single permeation experiment.

Sample side and environment side test compound concentrations are calculated from each compound's calibration curve or response factor (equation 1 or 3). Concentrations are then volume-corrected for each specific set of permeation flasks if permeant mass is desired.

4.0 Sample Analysis

4.1 Instrument Parameters

Standards and samples are analyzed by gas chromatography using the following method parameters:

Column: J&W column, DB-5, 30M, 0.25 mm ID, 1 umdf
Carrier: Hydrogen
Split Vent: 9.4 ml/min
Injection Port Temp: 105° C.
Flame Detector Temp: 200° C.
Oven Temp 1: 75° C.
Program Rate 1: 15° C.
Oven Temp 2: 125° C.
Rate 2: 20° C.
Final Oven Temp: 200° C.
Final Hold Time: 2 Min The six-port sampling valve temperature is set to 105° C.

4.2 Calibration

A three point calibration is prepared using standards in the range of the following test compounds:

| Test Compounds | Calibration Curve Range ppm ($\mu$L) |
| --- | --- |
| Ethanol | 2–20 |
| Toluene | 0.3–3 |
| p-Xylene | 0.2–2 |
| o-Xylene | 0.1–1 |
| 1,2,4-Trimethyl Benzene | 0.05–0.5 |
| Naphthalene | 0.05–0.5 |
| Naphtha Solvent Blend | 4.0–40 |

To prepare a calibration standard, add an appropriate volume of the working standard solution to an aliquot of reagent water in a volumetric flask.

4.2.1 Secondary Dilutions of Working Standard for Calibration Curve 5 to 1 dilution: Place 5 ml of working standard into a 25-ml volumetric flask, stopper, then mix by inverting flask.

2.5 to 1 dilution: Place 10 ml of working standard into a 25-ml volumetric flask, stopper, then mix by inverting flask.

Analyze each calibration standard and tabulate compound peak area.response versus the concentration of the test compound in the environment side cell. The results are used to prepare a calibration curve for each compound. The naphtha solvent blend is a commercial paint solvent containing approximately twenty (20) individual aliphatic hydrocarbon compounds. The response versus concentration is determined by totaling the area under each of the twenty individual peaks. Method of least squares is used to fit a straight line to the calibration curve. The slope of each test compound's calibration curve is then calculated for determining the unknown concentration. The average response factor may be used in place of the calibration curve.

The working calibration curve or response factor must be verified on each working day by measurement of one or more calibration standards. If the response of any compound varies more than 20%, the test must be repeated using a fresh calibration standard. If the results still do not agree, generate a new calibration curve.

4.3 Analysis of Calibration Curve and Method Detection Level Samples

Recommended chromatographic conditions are summarized above.

Calibrate the system daily as described above.

Check and adjust split vent rate and check rate with soap film flow meter.

To generate accurate data, samples, calibration standards and method detection level samples must be analyzed under identical conditions.

Calibration standards and method detection samples are prepared in the environment flask only. This is accomplished by using a ½ inch plastic disk and aluminum sheet disk the diameter of the environment flange in place of the sample flask. A single sealing ring is placed onto the environmental glass flange followed by an aluminum sheet, and then the plastic disk.

The environment flask is flushed with dry compressed air to remove humidity in the sample and environment flask. This is done by puncturing the environment septa with a needle and tubing assembly which permits a controlled flow of dry air through the flask. The clamp rings are loosely fitted to the flask to eliminate pressure buildup. After flushing both flasks for approximately 10 minutes, the needle is removed and the clamp rings tightened, sealing the aluminum sheet against the seal ring.

Next, 40 $\mu$l of the permeation ethanol/aromatic working standard or secondary dilutions of the working standard is injected into the environment flask. Alternatively, 40 $\mu$L of the naphtha solvent blend or secondary dilutions of the working standard is injected into the environmental flask. The time is recorded and the flask is placed into a thermostatically controlled oven.

At the end of 30 minutes, the environment flask is removed from the oven. The environmental flask is analyzed using a heated six-port sampling valve fitted with a 1 ml loop. The loop is flushed with a 1 ml volume of the environment-side or sample-side air. The loop is injected onto the capillary column. The GC/FID system is started manually following the injection.

4.4 Calculation of Results 4.4.1 Test Compound Response Factor

Sample-side and environment-side test compound concentrations are calculated for each compound's calibration curve slope or response factor (RF). Concentrations are then volume-corrected for each specific set of permeation cells if permeant mass is desired.

$$\text{Concentration of Compound in ppm} = \frac{\text{Peak Area}}{\text{Calibration Curve Slope}} \quad (1)$$

$$\text{Compound Specific } RF = \frac{\text{Concentration of Compound in ppm}}{\text{Peak Area}} \quad (2)$$

$$\text{Concentration of Compound in ppm} = \text{Peak Area} \times RF \quad (3)$$

The cumulative penetrant mass is plotted as a function of time on both the upstream (environment) and downstream (sample) side of the film. The diffusion rate and transmission rate of the permeant area calculated from the transmission curve data.

4.4.2 Transmission Rate

When a permeant does not interact with the polymer, the permeability coefficient, R, is usually characteristic for the permeant-polymer system. This is the case with the permeation of many gases, such as hydrogen, nitrogen, oxygen, and carbon dioxide, through many polymers. If a permeant interacts with polymer molecules, as is the case with the permeant test compounds used in this method, P is no longer constant and may depend on the pressure, film thickness, and other conditions. In such cases, a single value of P does not represent the characteristic permeability of the polymer membrane and it is necessary to know the dependency of P on all possible variables in order to obtain the complete profile of the permeability of the polymer. In these cases, the transmission rate, Q, is often used for practical purposes, when the saturated vapor pressure of the permeant at a specified temperature is applied across the film. Permeability of films to water and organic compounds is often expressed this way.

$$P = \frac{(\text{Amount of Permeant})(\text{Film Thickness})}{(\text{Area})(\text{Time})(\text{Pressure-Drop Accross the film})} \quad (4)$$

$$Q = \frac{(\text{Amount of Permeant})(\text{Film Thickness})}{(\text{Area})(\text{Time})} \quad (5)$$

In this application, Q is represented in units of $$\frac{\text{gm} - 0.001 \text{ inches}}{100 \text{ in}^2\text{-day}}.$$

One of the major variables in determining the permeation coefficient is the pressure drop across the film. Since the transmission rate Q includes neither pressure nor concentration of the permeant in its dimensions, it is necessary to know either vapor pressure or the concentration of permeant under the conditions of the measurement in order to correlate Q to P.

The pressure-drop across the film from environment side to sample side is principally due to water vapor pressure. The water concentration or humidity does not remain constant and is not measured during the time intervals the organic compounds are analyzed, and therefore the pressure across the membrane is not determined.

The above examples of thermoplastic films containing a variety of compatible cyclodextrin derivatives shows that the invention can be embodied in a variety of different thermoplastic films. Further, a variety of different compatible derivatized cyclodextrin materials can be used in the invention. Lastly, the films can be manufactured using a variety of film manufacturing techniques including extrusion and aqueous dispersion coating to produce useful barriers.

Migration from Food and Beverage Packaging Materials

The migration of trace amounts of reaction and degradation byproducts, additives, oligomers and monomers from food and beverage packaging can affect consumer acceptance, product quality and regulatory approval of candidate packaging materials. Tests were conducted to measure the transfer of these substances from packaging films with and without acetylated cyclodextrin using a method from The Center for Food Safety and applied Nutrition of the U.S. Food and Drug Administration (FDA). The method simulates the expected migration of these substances in a packaging film to a particular food type, but the packaging test material is subjected to accelerated testing which simulates migration occurring to real food under normal conditions of packaging and storage.

We produced six experimental high density poyethylene (HDPE) test films. One of the films contained 0.5% (wt/wt) acetylated $\alpha$ cyclodextrin, two contained a acetylated $\beta$ cyclodextrin at 0.5% and 1.0% loading levels, and two contained a mixture of acetylated $\alpha$ and $\beta$ cyclodextrin at 0.5% and 1.0% loading levels. The sixth film was a control made from the same batch of HDPE (DOW 640) and additives (DYNAMAR® FX-9613 processing additive; IRGAFOS® 168 and IRGANOX® 1076 antioxidants) but without cyclodextrin. The films were fabricated by blown film extrusion and had a normal thickness of 2 mil.

Migration testing was conducted according to FDA guidelines for food-simulating liquids. The migration cells were for single sided flexible film and conform to ASTM F34–92. The food simulating liquid was 8% ethanol in deionized water and test temperature 40° C.

The food-simulating liquid (FSL) was withdrawn from the extraction cell after seven days. The FSL was reduced in volume, exhcnaged with methylene chloride and then analyzed by gas chromatography using flame ionization detection. The gas chromatograms of the six test film FSL extracts are provided in the attached figures. The peaks indicated in the chromatograms are migrants that diffused from the HDPE film into the FSL.

The reduction in the migrant amount was determined quantitatively by comparison of the gas chromatographic total peak areas from 4 minutes to 30 minutes. Film samples containing acetylated cyclodextrin were compared to the control film made from the same HDPE resin and additives but without cyclodextrin. The percent reduction of extractable migrants in the 8% ethanol FSL was determined using the following equation:

% Reduction in Extractable =

$$\frac{\text{(Control Film Total Peak Area} - \text{Sample Film Total Peak Area)}}{\text{Control Film Total Peak Area}}$$

We were interested in the extent of migration of trace amounts of reaction and degradation byproducts, additives and oligomers in films whose resin contained acetylated cyclodextrin by comparing their gas chromatographic results with film whose resin did not contain acetylated cyclodextrin. These results are provided in Table 1.

We compounded four experimental polypropylene (Montel 8623) pellets. Three of the compounded pellets contained acetylated α cyclodextrin, acetylated β cyclodextrin, and a 50%/50% mixture of acetylated α and β cyclodextrin each at a loading level of 0.75% (wt/wt). The fourth was a control pellet made from the same batch of polypropylene resin and additives (DYNAMAR® FX-9613 processing additive; IRGAFOS® 168 and IRGANOX® 1076 antioxidants) but without cyclodextrin.

The method consists of three separate steps; the first two are carried out simultaneously while the third, an instrumental technique for separating and detecting volatile organic compounds, is conducted after one and two. In the first step, an inert pure, dry gas is used to strip volatiles from the sample. During the gas stripping step, the sample is heated at 120° C. The sample is spiked with a surrogate (benzene-d6) immediately prior to the analysis. Benzene-d6 serves as an internal ZC surrogate to correct each set of test data for recovery. The second step concentrates the volatiles removed from the sample by freezing the compounds from the stripping gas in a headspace vial immersed in a liquid nitrogen trap. At the end of the gas-stripping step, an internal standard (toluene-d8) is injected directly into the headspace GC/FID Analysis Results of Single Sided HDPE Film Extractions*
8% Ethanol in Water Extraction Seven Days at 40° C.

| Sample Film Identification | Cyclodextrin Loading Level in HDPE Film % by Wt. | Extractable Organic Components Expressed as Total GC Peak Areas | Reduction in Extractable Components Expressed as a % of Control Film |
|---|---|---|---|
| Control HDPE Film | NA | 20,720 | NA |
| Acetylated α Cyclodextrin | 0.5% | 9,592 | 54% |
| Acetylated β Cyclodextrin | 0.5% | 869 | 96% |
| Acetylated β Cyclodextrin | 1.0% | 1,651 | 92% |
| Acetylated α and Acetylated β Cyclodextrin | 0.25% ea. | 3,473 | 83% |
| Acetylated α and Acetylated β Cyclodextrin | 0.5% ea. | 16,125 | 22% |

*ASTM Designation: F34–92 for Standard Practice for Construction of Test Cell for Liquid Extraction of Flexible Barrier Materials

Simulated Volatiles Migration from Food and Beverage Packaging Pellets

Food that comes into direct contact with polymeric packaging materials may result in the transfer or migration of volatiles into the stored food product. Though the package materials are approved for direct food contact, they can impart flavors to the food. Volatiles can become incorporated into the pellets during the manufacturing process. When these pellets are converted to film, the flavor of the film can be affected by the residual volatiles.

vial and the vial is capped immediately. Method and system blanks are interspersed with samples and treated in the same manner as samples to monitor contamination. The concentrated organic components are then separated, identified and quantitated by heated headspace high resolution gas chromatography-mass spectrometry (HRGC/MS). The results of the residual volatile analysis are presented in Table 1. The GC/MS total ion chromatograms are provided in the Figures.

Headspace GC/MS Analysis Results of Extruded Polypropylene Pellets
Pellets Heated to 12° C. for 45 Minutes

| Sample Pellet Identification | Cyclodextrin Loading Level in PP Pellets % by Wt. | Mobile Volatile Organic Components Expressed as Total GC Peak Areas | Reduction in Mobile Volatile Organic Components in Acetylated CD Pellets Expressed as a % of Control Pellets |
|---|---|---|---|
| Control Pellets | NA | 16,294,162 | NA |
| Acetylated α Cyclodextrin Pellets | 0.75% | 2,365,120 | 85% |
| Acetylated α Cyclodextrin Pellets (Duplicate) | 0.75% | 4,109,950 | 75% |

-continued

Headspace GC/MS Analysis Results of Extruded Polypropylene Pellets
Pellets Heated to 12° C. for 45 Minutes

| Sample Pellet Identification | Cyclodextrin Loading Level in PP Pellets % by Wt. | Mobile Volatile Organic Components Expressed as Total GC Peak Areas | Reduction in Mobile Volatile Organic Components in Acetylated CD Pellets Expressed as a % of Control Pellets |
|---|---|---|---|
| Acetylated β Cyclodextrin Pellets | 0.75% | 8,977,360 | 45% |
| Acetylated α and Acetylated β Cyclodextrin Pellets | 0.375% ea. | 2,938,261 | 82% |
| Acetylated α and Acetylated β Cyclodextrin Pellets (Duplicate) | 0.375% ea. | 3,896,854 | 76% |

TABLE 4

(CONTROL)
WATER VAPOR TRANSMISSION RATE[2]
Test Conditions: 100 Degrees Fahrenheit
90% Relative Humidity

| Sample ID | Thickness Measurements (mils) | | | | gms/100 in$^2$/24 Hrs | gms*mils/ 100 in$^2$/ 24 Hrs |
| | 1 | 2 | 3 | Ave | | |
|---|---|---|---|---|---|---|
| Roll # 1, Rep 1 | 1.3 | 1.35 | 1.3 | 1.32 | 0.5651 | |
| Rep 2 | 1.25 | 1.25 | 1.2 | 1.23 | 0.6470 | |
| Rep 3 | 1.2 | 1.2 | 1.3 | 1.23 | 0.5581 | |
| Rep 4 | 1.35 | 1.4 | 1.3 | 1.35 | 0.5570 | |
| Rep 5 | 1.5 | 1.55 | 1.5 | 1.52 | 0.4977 | |
| LLDPE Control | Ave. = 1.33 | | | | 0.5650 | 0.7514 |

[2]Measurements made using Standard Methods ASTM E 96–92.

TABLE 5A

| Sample ID | Thickness Measurements (mils) | | | | gms/100 in$^2$/24 Hrs | gms*mils/ 100 in$^2$/ 24 Hrs |
| | 1 | 2 | 3 | Ave | | |
|---|---|---|---|---|---|---|
| Roll # 7, Rep 1 | 1.2 | 1.2 | 1.3 | 1.23 | 0.5456 | |
| Rep 2 | 1.1 | 1.1 | 1.2 | 1.13 | 0.6335 | |
| Rep 3 | 1.25 | 1.15 | 1.3 | 1.23 | Film Wrinkled | |
| Rep 4 | 1.25 | 1.3 | 1.35 | 1.30 | 0.5389 | |
| Rep 5 | 1.1 | 1.15 | 1.25 | 1.17 | 0.6374 | |
| LLDPE with 0.5% Acetylated CD | Ave. = 1.21 | | | | 0.5889 | 0.7145 |

TABLE 5B

| Sample ID | Thickness Measurements (mils) | | | | gms/100 in$^2$/24 Hrs | gms*mils/ 100 in$^2$/ 24 Hrs |
| | 1 | 2 | 3 | Ave | | |
|---|---|---|---|---|---|---|
| Roll # 6, Rep 1 | 1.15 | 1.2 | 1.2 | 1.18 | 0.6165 | |
| Rep 2 | 1.2 | 1.35 | 1.35 | 1.30 | 0.5265 | |
| Rep 3 | 1.3 | 1.35 | 1.3 | 1.32 | 0.5568 | |
| Rep 4 | 1.25 | 1.25 | 1.3 | 1.27 | 0.55987 | |
| Rep 5 | 1.2 | 1.2 | 1.25 | 1.22 | 0.6099 | |

TABLE 5B-continued

| Sample ID | Thickness Measurements (mils) | | | | gms/100 in$^2$/24 Hrs | gms*mils/ 100 in$^2$/ 24 Hrs |
| | 1 | 2 | 3 | Ave | | |
|---|---|---|---|---|---|---|
| LLDPE with 1% Acetylated CD | Ave. = 1.26 | | | | 0.5739 | 0.7212 |

TABLE 5C

| Sample ID | Thickness Measurements (mils) | | | | gms/100 in$^2$/24 Hrs | gms*mils/ 100 in$^2$/ 24 Hrs |
| | 1 | 2 | 3 | Ave | | |
|---|---|---|---|---|---|---|
| Roll # 8, Rep 1 | 1.20 | 1.20 | 1.30 | 1.23 | 0.5987 | |
| Rep 2 | 1.10 | 1.20 | 1.10 | 1.13 | 0.6857 | |
| Rep 3 | 1.10 | 1.20 | 1.30 | 1.20 | 0.6694 | |
| Rep 4 | 1.15 | 1.25 | 1.25 | 1.22 | 0.6268 | |
| Rep 5 | 1.00 | 1.15 | 1.05 | 1.07 | 0.6438 | |
| LLDPE with 2% Acetylated CD | Ave. = 1.17 | | | | 0.6449 | 0.7545 |

A comparison of Table 4 with Tables 5A to 5C shows a substantial reduction in WVTR in linear low density polyethylene films using an acetylated cyclodextrin. An improvement of WVTR by greater than or equal to 5% is considered surprising and significant.

TABLE 6A

| Sample ID | Thickness Measurements (mils) | | | | gms/100 in$^2$/24 Hrs | gms*mils/ 100 in$^2$/ 24 Hrs |
| | 1 | 2 | 3 | Ave | | |
|---|---|---|---|---|---|---|
| Roll # 14, Rep 1 | 1.20 | 1.20 | 1.20 | 1.20 | 0.5996 | |
| Rep 2 | 1.00 | 1.20 | 1.20 | 1.13 | 0.7128 | |
| Rep 3 | 1.25 | 1.25 | 1.10 | 1.20 | 0.6481 | |
| Rep 4 | 1.25 | 1.25 | 1.20 | 1.23 | 0.5914 | |
| Rep 5 | 1.20 | 1.25 | 1.25 | 1.23 | 0.6678 | |
| LLDPE with 0.5% TMSE CD | Ave. = 1.20 | | | | 0.6439 | 0.7727 |

TABLE 6B

| Sample ID | Thickness Measurements (mils) 1 | 2 | 3 | Ave | gms/100 in$^2$/24 Hrs | gms*mils/ 100 in$^2$/ 24 Hrs |
|---|---|---|---|---|---|---|
| Roll # 12, Rep 1 | 1.05 | 1.15 | 1.30 | 1.17 | 0.7557 | |
| Rep 2 | 1.25 | 1.30 | 1.25 | 1.27 | 0.6262 | |
| Rep 3 | 1.30 | 1.30 | 1.25 | 1.28 | 0.6898 | |
| Rep 4 | 1.15 | 1.30 | 1.30 | 1.25 | 0.7126 | |
| Rep 5 | 1.40 | 1.20 | 1.40 | 1.33 | 0.6427 | |
| LLDPE with 1% TMSE CD | | Ave. = 1.26 | | | 0.6854 | 0.8636 |

TABLE 6C

| Sample ID | Thickness Measurements (mils) 1 | 2 | 3 | Ave | gms/100 in$^2$/24 Hrs | gms*mils/ 100 in$^2$/ 24 Hrs |
|---|---|---|---|---|---|---|
| Roll # 16, Rep 1 | 1.10 | 1.10 | 1.00 | 1.07 | 0.7594 | |
| Rep 2 | 1.00 | 1.00 | 1.00 | 1.00 | 0.6724 | |
| Rep 3 | 1.00 | 1.10 | 1.00 | 1.03 | 0.7293 | |
| Rep 4 | 1.00 | 0.90 | 0.90 | 0.93 | 0.8853 | |
| Rep 5 | 1.10 | 1.10 | 1.10 | 1.10 | Film Wrinkled | |
| LLDPE with 2% TMSE CD | | Ave. = 1.03 | | | 0.7616 | 0.7819 |

A comparison of Table 4 with Tables 6A–6C shows a substantial reduction in WVTR in linear low density polyethylene films using a acetyl modified cyclodextrin.

TABLE 7

| PE #1 | AVERAGE | WVTR | WVTR/THICKNESS | CONTROL | |
|---|---|---|---|---|---|
| A | 2.62 | 0.3748 | 0.1431 | | |
| B | 2.37 | 0.4689 | 0.1978 | 0.1685 | AVERAGE |
| C | 2.51 | 0.385 | 0.1534 | 0.0214 | STD. DEV. |
| D | 2.35 | 0.4191 | 0.1783 | | |
| E | 2.46 | 0.4174 | 0.1697 | | |
| PE #2 | AVERAGE | WVTR | WVTR/THICKNESS | .5% ALPHA | |
| A | 1.9 | 0.5396 | 0.2840 | | |
| B | 2 | 0.5226 | 0.2613 | 0.2658 | AVERAGE |
| C | 2.35 | 0.4268 | 0.1816 | 0.0500 | STD. DEV. |
| D | 1.9 | 0.5592 | 0.2943 | | |
| E | 1.86 | 0.572 | 0.3075 | | |
| PE #3 | AVERAGE | WVTR | WVTR/THICKNESS | 1.0% ALPHA | |
| A | 2.27 | 0.4561 | 0.2009 | | |
| B | 1.9 | 0.5 | 0.2632 | 0.2259 | AVERAGE |
| C | 2.44 | 0.4293 | 0.1759 | 0.0629 | STD. DEV. |
| D | 2.375 | 0.408 | 0.1718 | | |
| E | 1.78 | 0.5652 | 0.3175 | | |
| PE #4 | AVERAGE | WVTR | WVTR/THICKNESS | .5% BETA | |
| A | 2.34 | 0.4199 | 0.1794 | | |
| B | 1.88 | 0.5516 | 0.2934 | 0.1976 | AVERAGE |
| C | 2.29 | 0.4327 | 0.1890 | 0.0557 | STD. DEV. |
| D | 2.58 | 0.3812 | 0.1478 | | |
| E | 2.32 | 0.4144 | 0.1786 | | |
| PE #5 | AVERAGE | WVTR | WVTR/THICKNESS | 1.0% BETA | |
| A | 2.43 | 0.4199 | 0.1728 | | |
| B | 1.84 | 0.5724 | 0.3111 | 0.2507 | AVERAGE |
| C | 1.86 | 0.5711 | 0.3070 | 0.0731 | STD. DEV. |
| D | 2.42 | 0.4093 | 0.1691 | | |
| E | 1.9 | 0.5571 | 0.2932 | | |
| PP #8 | AVERAGE | WVTR | WVTR/THICKNESS | CONTROL | |
| A | 2.46 | 0.2888 | 0.1174 | | |
| B | 2.34 | 0.3386 | 0.1447 | 0.1123 | AVERAGE |
| C | 2.66 | 0.2807 | 0.1055 | 0.0200 | STD. DEV. |
| D | 2.92 | 0.2832 | 0.0970 | | |
| E | 3.17 | 0.3071 | 0.0969 | | |
| PP #9 | AVERAGE | WVTR | WVTR/THICKNESS | .5% ALPHA | |
| A | 2.77 | 0.2636 | 0.0952 | | |
| B | 2.81 | 0.2713 | 0.0965 | 0.1139 | AVERAGE |

TABLE 7-continued

| | | | | | |
|---|---|---|---|---|---|
| C | 2.32 | 0.3288 | 0.1417 | 0.0192 | STD. DEV. |
| D | 2.5 | 0.3006 | 0.1202 | | |
| E | 2.54 | 0.2939 | 0.1157 | | |
| PP #10 | AVERAGE | WVTR | WVTR/THICKNESS | 1.0% ALPHA | |
| A | 2.79 | 0.2658 | 0.0953 | | |
| B | 2.45 | 0.3037 | 0.1240 | 0.0971 | AVERAGE |
| C | 2.65 | 0.2764 | 0.1043 | 0.0237 | STD. DEV. |
| D | 2.71 | 0.2781 | 0.1026 | | |
| E | 3.35 | 0.198 | 0.0591 | | |
| PP #11 | AVERAGE | WVTR | WVTR/THICKNESS | .5% BETA | |
| A | 2.91 | 0.2607 | 0.0896 | | |
| B | 2.86 | 0.2487 | 0.0870 | 0.0813 | AVERAGE |
| C | 3.43 | 0.2189 | 0.0638 | 0.0102 | STD. DEV. |
| D | 2.84 | 0.2321 | 0.0817 | | |
| E | 2.9 | 0.2453 | 0.0846 | | |
| PP #12 | AVERAGE | WVTR | WVTR/THICKNESS | 1.0% BETA | |
| A | 2.53 | 0.2854 | 0.1128 | | |
| B | 3.42 | 0.2206 | 0.0645 | 0.0801 | AVERAGE |
| C | 2.71 | 0.2564 | 0.0946 | 0.0229 | STD. DEV. |
| D | 3.47 | 0.2036 | 0.0587 | | |
| E | 3.04 | 0.2121 | 0.0698 | | |

Table 7 contains examples of polyethylene and polypropylene films containing 0–1 wt % substituted cyclodextrin and related MVTR data.

The above specification, examples of substituted cyclodextrin, extruded thermoplastic films and test data provide a basis for understanding the technical aspects of the invention. Since the invention can be made with a variety of embodiments, the invention resides in the claims hereinafter appended.

We claim:

1. A method to prevent contamination of a food item by moisture derived from moisture vapor, which method comprises separating the food item from a source of moisture vapor by imposing a thermoplastic film barrier between the food item having a water activity of 0.1 to 0.8 and the source of moisture vapor, the film moisture vapor barrier comprising:

(a) a thermoplastic polymer film; and
    (b) uniformly dispersed in the film, an effective moisture absorbing amount of a polymer compatible modified cyclodextrin;

wherein the modified cyclodextrin is free of an inclusion complex compound and the film has a water vapor transmission rate of 0.8 gm-mil/100 in$^2$-day.

2. The method of claim 1 wherein food has a water activity of 0.1 to 0.6 and the thermoplastic polymer comprises a vinyl polymer comprising an α-olefin and the film has a water vapor transmission rate of less than 0.6 gm-mil/100 in$^2$-day.

3. The method of claim 1 wherein the thermoplastic polymer comprises a chlorine containing vinyl polymer comprising vinyl chloride or vinylidene chloride.

4. The method of claim 1 wherein the modified cyclodextrin contains at least one substituent on a cyclodextrin primary carbon atom.

5. The method of claim 1 wherein the modified cyclodextrin comprises a modified α-cyclodextrin, a modified β-cyclodextrin, a modified γ-cyclodextrin or mixtures thereof.

6. The method of claim 1 wherein the thermoplastic web contains about 0.1 to 10 wt-% of the polymer compatible modified cyclodextrin.

7. The method of claim 2 wherein the thermoplastic vinyl polymer comprises a polyethylene having a melt index of 0.1 to 4 and a weight average molecular weight greater than about 200,000.

8. The method of claim 7 wherein the thermoplastic polyethylene comprises a linear polyethylene.

9. The method of claim 7 wherein the thermoplastic polyethylene comprises a linear low density polyethylene.

10. The method of claim 1 wherein the modified cyclodextrin comprises an acetyl cyclodextrin.

11. The composition of claim 1 wherein the modified cyclodextrin comprises a trimethyl silyl cyclodextrin.

* * * * *

UNITED STATES PATENT AND TRADEMARK OFFICE
CERTIFICATE OF CORRECTION

PATENT NO. : 5,883,161
DATED    : MARCH 16, 1999
INVENTOR(S): WOOD ET AL.

It is certified that error appears in the above-identified patent and that said Letters Patent is hereby corrected as shown below:

Col. 15, lines 65-67: "greater than about 0.8 gram-mil/100 inches$^2$-day, preferably greater than 0.5 gram-mil/100 inches$^2$-day." should read --less than about 0.8 gram-mil/100 inches$^2$-day, preferably less than 0.5 gram-mil/100 inches$^2$-day.--

Col. 31, line 40, claim 1: insert --moisture vapor-- after the word "film"

Col. 31, line 41, claim 1: "item" should read --item,--

Col. 31, line 41, claim 1: insert --the food-- before the word "having"

Col. 31, line 41, claim 1: "0.8" should read --0.8,--

Col. 31, line 50, claim 1: insert --less than-- before the numerals "0.8"

Col. 31, line 51, claim 2: insert --the-- after the word "wherein"

Signed and Sealed this

First Day of May, 2001

*Attest:*

NICHOLAS P. GODICI

*Attesting Officer*     Acting Director of the United States Patent and Trademark Office